(12) United States Patent
Tucker

(10) Patent No.: US 6,314,676 B1
(45) Date of Patent: Nov. 13, 2001

(54) HYDROPONIC PLANT CULTURE SYSTEMS

(75) Inventor: Martin Robilliard Tucker, Northumberland (GB)

(73) Assignee: Biofil Limited, Liverpool (GB)

( * ) Notice: Subject to any disclaimer, the term of this patent is extended or adjusted under 35 U.S.C. 154(b) by 0 days.

(21) Appl. No.: 09/381,144

(22) PCT Filed: Mar. 11, 1998

(86) PCT No.: PCT/GB98/00543

§ 371 Date: Oct. 27, 1999

§ 102(e) Date: Oct. 27, 1999

(87) PCT Pub. No.: WO98/39962

PCT Pub. Date: Sep. 17, 1998

(30) Foreign Application Priority Data

Mar. 11, 1997 (GB) .................................................. 9705001

(51) Int. Cl.[7] .................................................. A01G 31/00
(52) U.S. Cl. .................................................. 47/62 N
(58) Field of Search .................................. 47/59, 62; 210/169

(56) References Cited

U.S. PATENT DOCUMENTS

| | | | |
|---|---|---|---|
| 4,004,369 | * 1/1977 | Kato et al. | 47/62 N |
| 4,488,377 | 12/1984 | Sjöstedt . | |
| 4,713,173 | * 12/1987 | Goldman et al. | 210/169 |
| 4,754,571 | * 7/1988 | Riechmann | 47/59 |
| 4,828,999 | * 5/1989 | Jackson | 435/235.1 |
| 4,846,107 | 7/1989 | Fenske et al. . | |

FOREIGN PATENT DOCUMENTS

| | | | |
|---|---|---|---|
| 2019958 | 8/1990 | (RU) . | |
| 2019958 | * 9/1990 | (RU) | 47/59 |
| WO 97/07063 | 2/1997 | (WO) . | |

OTHER PUBLICATIONS

Derwent Publication: XP–002066435; JP920360267 921228; "Purification Bath Swimming Pool Water Filter Bacteria Decompose Protein Starch . . .".
Derwent Publ.: XP–002066436; JP910201571 910509; "Apparatus Promote Bacteria Metabolism Sewage Purification Comprise Bacteria . . . ".
Derwent Publ.: XP–002066434; JP40042016 940215; "Biological Treat Sewage Waste Water Comprise Fill Close Chamber Float Filter Material Carry Microorganism . . . ".
Derwent Publ.: XP–002066433; SU90 858292 900809; "Grow Plant Hydroponic System Non Circulate Type Introducing Pseudomonas Fluorescens Strain Bacteria . . . ".
Derwent Publication: XP–002066435; JP920360267 921228; "Purification Bath Swimming Pool Water Filter Bacteria Decompose Protein Starch . . . ".*

* cited by examiner

Primary Examiner—Charles T. Jordan
Assistant Examiner—Francis T. Palo
(74) Attorney, Agent, or Firm—Darby & Darby

(57) ABSTRACT

A method for the hydroponic cultivation of plants which includes passing a nutrient liquid through a filter which has been impregnated with one or more cultures of microorganisms capable of controlling the growth or germination of pathogenic fungi. The impregnated filter releases a portion of the microorganisms into the nutrient liquid as the liquid passes through the filter. The nutrient liquid containing the microorganisms is then contacted with at least the roots of the plants, or parts thereof. The invention is also directed to the filter unit which includes a pre-filter for removing particulate matter, an assembly containing fibrous material impregnated with the biomaterial, a flow means for transporting the nutrient liquid through the fibrous material so that the biomaterial is released in a continuous, controlled manner into the nutrient liquid, and a discharge means to discharge the nutrient liquid containing a portion of the biomaterial from the filter unit.

11 Claims, 2 Drawing Sheets

HYDROPONIC PLANT CULTURE SYSTEMS

FIELD OF THE INVENTION

Figure 1:
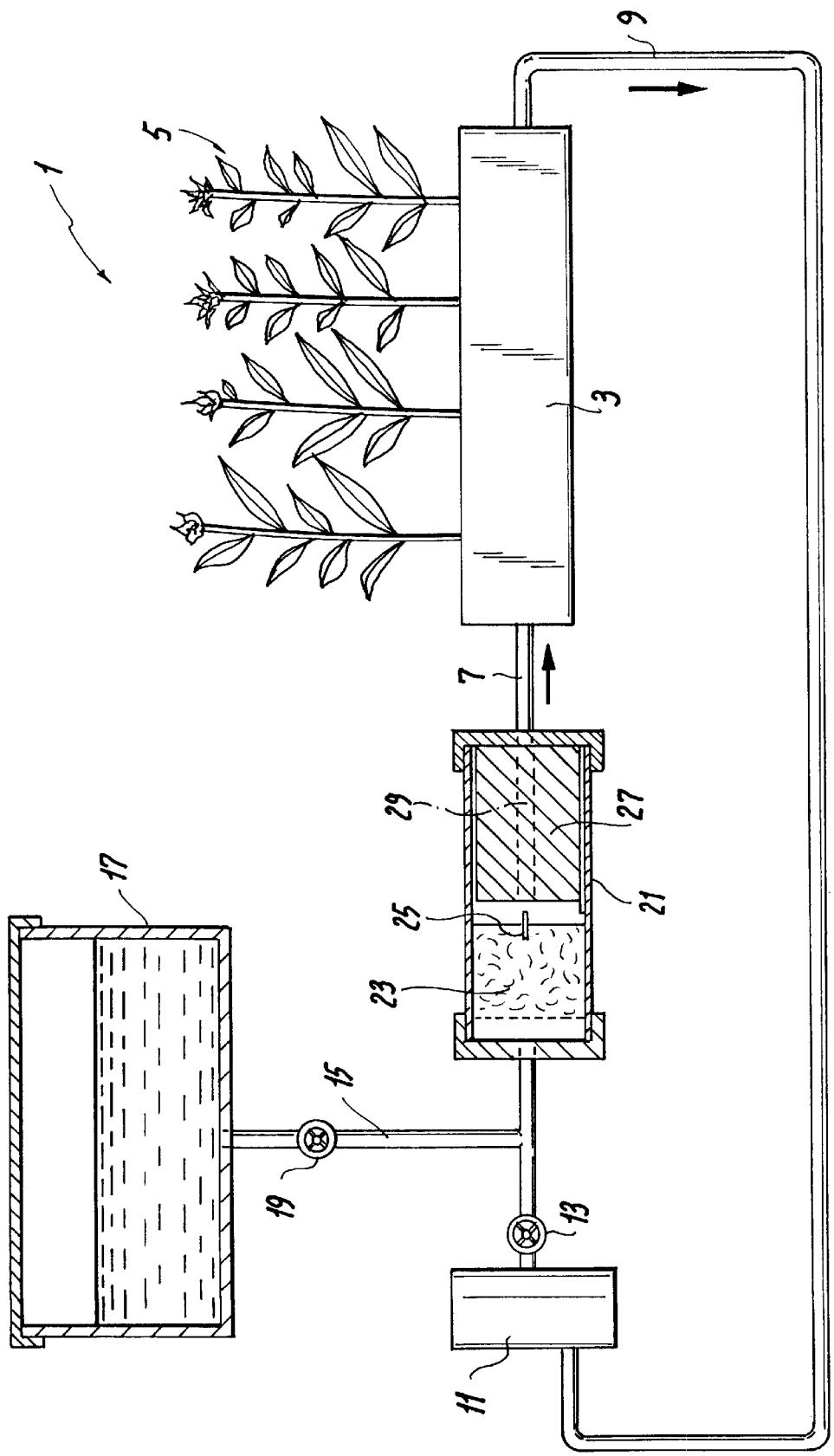

This invention relates to hydroponic plant culture systems in which plants are cultivated in the absence of soil and with their roots located in a flowing aqueous medium containing the plant nutrients.

BACKGROUND OF THE INVENTION

Hydroponic cultivation has several advantages over traditional soil cultivation. In particular, the risk from persistent soil-borne diseases is minimised, there is no damage as a result of repetitive cultivation in the same area and the cultivation crop cycle is shorter. Accordingly, hydroponic cultivation has been expanding rapidly over recent years. Nearly all salad crops commercially grown in the UK are produced in glasshouses by a hydroponic system.

There are two systems for the hydroponic cultivation of plants. Typically plants are grown on a large amount of substrate, such as slabs or blocks of mineral fibre. The slabs or blocks are drip fed intermittently with a nutrient solution. The particular feeding programme depends on conditions affecting rates of nutrient utilisation and water uptake.

Alternatively, the plants are grown by a method known as nutrient film technique (NFT) wherein plants are taken from the propagation block in which they are supplied, and suspended so that their roots are in contact with fast flowing nutrient solution.

For economic use of nutrients, and because of regulatory factors affecting the disposal of nutrient-rich water, the water carrying the nutrients needs to be recycled. This may be carried out continuously or, for instance, by collecting the liquid medium in batches, for instance, one thousand liter batches, and then processing the batches for re-use. Since about 70 percent of the inflowing liquid is retained by the plants, or lost by evaporation and respiration, reprocessing the outflowing liquid effectively involves dilution and re-adjustment of nutrient levels.

Although the hydroponic nutrient solutions contain no organic source of carbon when applied to the plants, the outflowing liquid accumulates organic exudates from the plant roots and also possibly from algae that grow on the well lit surfaces of the growth blocks. As a result, carbon-containing nutrients build up on which plant-pathogenic fungi can grow. Accordingly, a major problem for those operating a recycling hydroponic system is the control of fungal pathogens, and particularly their spores, which tend to accumulate in the liquid and hence constantly re-infect the plants.

The above mentioned problem is currently being tackled by attempting to sterilise the nutrient liquid before it is recycled. Sterilisation methods include pasteurisation, hollow-fibre ultrafiltration, UV-irradiation and chemical treatments using, for instance, ozone or peracetic acid. However, such methods are expensive and they also eliminate a potentially beneficial group of bacteria which may help to control fungal pathogens.

STATEMENTS OF INVENTION

The present invention uses microorganisms capable of suppressing or controlling the growth of pathogenic fungi to suppress or control such growth in hydroponic nutrient solution. More particularly, the present invention provides a method of hydroponic cultivation of plants, the method comprising feeding a nutrient liquid to at least the roots, or parts thereof, of said plants and passing said nutrient liquid through a fibrous filter unit containing one or more cultures of microorganisms, said microorganisms being capable of suppressing or controlling the growth or germination of pathogenic fungi.

The present invention also provides a method of treating nutrient liquid in a hydroponic plant cultivation system, the method comprising passing the liquid through a filter medium having located thereon microorganisms capable of suppressing the growth or germination of pathogenic fungi in the system.

The present invention further provides apparatus for treating nutrient liquid in a hydroponic plant cultivation system, the apparatus including a fibrous filter unit containing one or more cultures of microorganisms, at least one of said cultures being capable of suppressing or controlling the growth or generation of pathogenic fungi.

Microorganisms used in the present invention may also have a bactericidal effect thereby reducing or eliminating harmful bacteria.

The microorganisms are typically bacteria and/or non-pathogenic fungi which have the ability to suppress fungal pathogens. The particular mechanism or mechanisms by which suppression takes place may vary from one microorganism to another. For instance, it is believed that a group of bacteria known as the fluorescent pseudomonads (the *Pseudomonas fluorescens* group) are capable of colonising root surfaces of plants to give effective disease control, possibly by outcompeting the fungi for essential iron.

The filter medium may be pre-impregnated with the microorganisms. Such a filter medium may be freeze-dried for storage purposes. Additionally or alternatively, such a filter medium may also be vacuum-packed. The filter medium may, however, initially be free of microorganisms. They may then be introduced into the system by, for instance, introducing them into the nutrient liquid from where at least some will lodge in the filter medium.

The fibrous filter unit may include one or more mineral fibre slabs or blocks. The fibrous material may be any suitable mineral fibre such as rock wool, glass wool or slag wool. The density of the slab or block is preferably between 25 and 180 kg/m$^3$, more preferably between 25 and 120 kg/m$^3$, and most preferably between 35 and 80 kg/m$^3$.

The fibrous material may be provided in granular form, including, for instance, in the form of short, fibrous lengths of perhaps about 1 mm.

The mineral fibre slabs are preferably rock wool slabs of the type which is manufactured by Grodan A/S of Denmark.

In a method of the present invention, there is employed a biological filter impregnated with a microbial population which includes the appropriate fungus-suppressing bacteria and/or fungi which replaces a sterilisation unit in a hydroponic system. The filter will not only serve to remove fungi and fungal spores from the liquid as a result of its filtration capability but will also provide a continuous seeding of the circulating fluid, and hence the growth blocks in which the plants are located or on which they are supported, with the fungus suppressing microorganism.

It should be appreciated that the microorganisms, or mixture of microorganisms, which are employed may be selected for the particular plant to be cultivated.

MORE DETAILED DESCRIPTION OF THE INVENTION

Among the microorganisms which may be used in the present invention are members of the bacterial genera Pseudomonas, Bacillus, Acinetobactor, Lactobacillus, Flavobacterium, Serratia and non-pathogenic Xanthomonas and actinomycetes. Examples of specific species which may be used, either as the role microorganism or as a component of a mixture of microorganisms, are as follows:

Acinetobactor sp.
Bacillus cereus
Bacillus polymyxa
Bacillus pumilus
Bacillus subtilus
Flavobacterium odoratum
Lactobacillus sp.
Pseudomonas aeruginosa
Pseudomonas alcaligenes
Pseudomonas cepacia
Pseudomonas chlororaphis
Pseudomonas fluorescens
Pseudomonas maltophilia (also known as Xanthomonas maltophilia)
Pseudomonas paucimobilis
Pseudomonas putida
Serratia marcescens
Streptomyces lydicus.

Particularly preferable is isolate 3989A of *Pseudomonas fluorescens*, sourced from a tomato crop grown in a closed environment where *P. cryptogea* was visibly suppressed. Its original identification relied on the presence of fluorescence on Kings B medium. A sample of the microorganism was deposited at the International Mycological Institute of Bakeham Lane, Egham, TW20 9TY, UK on Mar. 6, 1998 under accession no IMI 378597.

The microorganism system of use in the method of the present invention should be capable of becoming established in the filter, in particular as a part of a biofilm.

The invention therefore comprises methods in which the suppressant bacteria or fungi are capable of becoming established as a part of this biofilm and compatible with other microbes in the established biofilm. Anti-fungal agents produced by the suppressant microorganisms may be active against other microbes that would normally be part of a biofilm structure. The composition of the circulating hydroponic solution will be suitable for biofilm growth in the filter. The microorganisms in the filter will be dependent for growth on organic plant root exudates accumulating in the fluid. The normal inorganic nutrient levels are likely to be satisfactory. However, organic exudates levels differ widely from one plant crop to another. The liquid flow rate through the filter should be sufficient to feed the biofilm at an appropriate rate. It should also ensure a sufficient residence time in the filter for the anti-fungal agents produced by the suppressant bacteria to damage the fungi, in addition, the liquid flow rate should ensure stability of the biofilm in the filter. Preferably, the flow should be continuous in order to avoid the possibility of biofilm breakdown.

The arrangement is such that there is normally a small but continuous release of live suppressant bacteria from the filter into the circulating liquid. As a result, the bacteria colonise any growth blocks and, in appropriate cases, the plant roots.

Bacteria are adapted to slow growth in biofilms, and accordingly the filter may be inoculated with bacteria that have been pre-adapted to a low growth rate.

SPECIFIC EMBODIMENTS OF THE INVENTION

I. Typical Method and Apparatus

A specific embodiment of a method and apparatus of the present invention will now be described, by way of example only, and with reference to FIGS. 1 and 2 of the accompanying drawings in which:

FIG. 1 is a diagrammatic depiction of apparatus of the invention; and

FIG. 2 is a graph showing Pseudomonas and *E.Coli* counts in a filter effluent.

Referring to FIG. 1, apparatus of the invention is in the form of a hydroponic system 1 which includes a plant growing structure 3 including growing channels in which are located rockwool blocks supporting plants 5.

Nutrient liquid is fed to structure 3 by means of a flow pipe 7, the liquid exiting from structure 3 by means of pipe 9. Pipes 7 and 9 form part of a continuous flow path for nutrient liquid so that the liquid may be continuously re-cycled. The liquid flow path further includes a pump 11 and a valve 13. Downstream of valve 13 a further pipe 15 joins to the flow path and is connected also to a replacement tank 17 containing nutrient liquid. Between tank 17 and the main flow pipe is a valve 19.

Further downstream there is located a filter unit 21. This unit includes a pre-filter 23 in the form of a polymeric, sponge-like material. Liquid passes through pre-filter 23 via duct 25 into the right-hand section (as seen in the drawing) of the unit 21. Located within this section is an assembly 27 of rings or squares of material held together by means of a stainless steel rod (not shown). The liquid passes into assembly 27 in a radially inward direction, entering a central passage 29 and thence into pipe 7.

In operation, plants 5 located in slabs or blocks of in structure 3 are allowed to grow while being supplied by nutrient liquid via pipes 7 and 9. Pump 11 is used to ensure that a flow of nutrient liquid is directed through filter unit 21 and into structure 3. The nutrient liquid emerging from structure 3 is fed by pipe 9 back to pump 11. The nutrient liquid becomes depleted by evaporation and plant take-up and, as and when required, the liquid is replenished from tank 17.

II. Establishment of Bacterium in Filter (a) Equipment

The present invention will now be further illustrated by the following Example which demonstrates that a viable population of a fungus-suppressing fluorescent pseudomonas bacterium can be established in an impregnated rock wool filter.

Cylindrical filters, 4 cm deep, 5 cm diameter, were housed in Perspex cylinders fitted with stainless steel top and bottom units sealed with neoprene O-rings to the cylinder. The filter was located on top of a sintered plastic support. Underneath the sinter was a small space (about 1 ml) which could be-sampled with a syringe needle through a neoprene septum in the side of the steel base unit. Flow through this cell assembly was controlled by a peristaltic pump connected to the top of the cell. Flow rates of 109 ml/h and 857 ml/h were obtained by altering the size of the pump tubing. Liquid was recycled through the filter from a 5 liter reservoir, with continuous stirring of the reservoir liquid with a magnetic stirrer.

For the gradual replacement of the starting liquid by hydroponic fluid, the fluid was metered into a one liter constant level reservoir by a second peristaltic pump at 109 ml/h (a dilution rate, D, of 0.109). The liquid in the reservoir was constantly mixed and pumped through the filter cell at 857 mil/h. Excess liquid was removed constantly by overflow from the constant level tube of the reservoir. By this method, complete liquid changeover took 6.4 h (calculated using the formula ln2/D).

(b) Microbiological Methods A strain (3989A) of fluorescent pseudomonas was mixed with *Escherichia coli* (capable of growth on selective MFC agar). A mixed microbial biofilm from a slow sand filter was provided by York Waterworks Plc.

Total bacterial counts were made on nutrient agar at 25° C. Fluorescent pseudomonads were enumerated on plates of Medium B (King, A and Phillips, I (1978) Journal of Medical Microbiology II, 165–176.) after growth at 25° C. for 24–36 h. *Escherichia coli* counts were carried out by passing 100 ml samples through 5 cm sterile 0.45 $\mu$m filters (Whatman). The filters were placed on plates of MF-Endo agar and incubated inverted for 24 h at 42° C.

(c) Filter Impregnation

The feed water was prepared as described in "Standard Methods for the Examination of Water and Wastewater" published by the American Public Health Association (1966). The stock reagents were:

i. Phosphate buffer—8.5 g $KH_2PO_4$, 21.75 g $K_2HPO_4$, 33.4 g $Na_2HPO_4.7H_2O$ and 1.7 g $NH_4Cl$ in 1 liter distilled water, pH 7.2.
  ii. Magnesium sulphate solution —22.5 g magnesium sulphate in 1 liter distilled water.
  iii. Calcium sulphate solution —27.5 g anhydrous calcium chloride in 1 liter distilled water.
  iv. Ferric chloride solution —0.25 g $FeCl_3.6H_2O$ in 1 liter distilled water. 1 ml of each of the stock solutions was added to 1 liter distilled water for use.

Filters were established using the mixed microbial population obtained by the following procedure: (i) Biofilm-loaded sand, from the slow sand filters at York Waterworks was suspended in artificial river water at 500 g (wet weight) per liter water; (ii) After sand has settled out at room temperature for 30 min the supernatant was inoculated into the feed water at 100 ml/liter. The inoculated feed water was circulated through the filter, as described above, for 5 days at room temperature. All reservoirs, tubing, filter holders and filters were sterilised by autoclaving before use.

(d) Inoculation with Fluorescent Pseudomonas

The Pseudomonas strain was inoculated from a nutrient agar plate into 50 ml Nutrient broth in a 250 ml Erlenrneyer flask and incubated with shaking at 200 rpm, 30° C., overnight. 0.01 ml of this culture was added to the reservoir of the filter assembly.

(e) Sampling

Samples were taken aseptically from the reservoir and directly from the outflow of the filter cells.

(f) Results
(i) Introduction of Fluorescent Pseudomonas Species into a Filter Containing a Mixed Microbial Biofilm Duplicate recirculating filter systems were inoculated with a mixed microbial culture from a slow sand filter as described, and circulation of 5 litres of the dilute nutrient "artificial river water" was continued at 857 ml/h for 5 days, at room temperature. The inoculum contained no fluorescent pseudomonads. After 5 days, the Pseudomonas sp. (overnight culture) was inoculated ($10^{-5}$ dilution) into the reservoir of one filter (A). The reservoir of the other filter (B) was replaced with 5 litres of sterile "artificial river water", which was also inoculated with the Pseudomonas sp. The outflowing water from both filters was sampled daily for Pseudomonas (identified as fluorescent pigmented colonies on the King medium) and the water from filter A was in addition monitored for "total bacteria" by plating on nutrient agar.

To determine the effect of water circulation rate, the flow was decreased to 109 ml/h after Day 13.

The results are shown in Table 1.

TABLE 1

| | Bacterial counts (cfu/ml) in effluent liquid from the filter | | |
|---|---|---|---|
| Days after | Pseudomonas count | | Other bacteria |
| inoculation | Filter A | Filter B | Filter A |
| 1 | 1800 | 1750 | 5900 |
| 4 | 2960 | 2100 | 5030 |
| 5 | 3050 | 3600 | 4020 |
| 6 | 4200 | 3900 | 2800 |
| 7 | 4520 | 4140 | 2100 |
| 8 | 4900 | 4300 | 1800 |
| 11 | 5030 | 5100 | 1200 |
| 12 | 5150 | 5320 | 820 |
| 13* | 5220 | 5350 | 700 |
| 14 | 5300 | 5300 | 600 |
| 15 | 4800 | 5340 | 540 |
| 18 | 5320 | 5200 | 300 |
| 19 | 5450 | 5600 | 240 |
| 20 | 5210 | 5340 | 19 |
| 21 | 4980 | 5410 | 7 |

*indicates the change of flow rate

Pseudomonas became established in the system and reached a stable population within a week. This was unaffected by a large decrease in flow rate imposed from day 13. The presence of other microorganisms in the circulating liquid in filter A had no effect of the Pseudomonas population. On the other hand, the other microrganisms in filter A were progressively lost from the circulating liquid. This process started at a high flow rate and continued at the lower flow rate. It was not possible to determine whether these microbes were eliminated from the filter, or only from the circulating liquid. A control experiment, identical with Filter A except that no Pseudomonas was added, showed no reduction in total bacterial count, suggesting that in Filter A the other microorganisms were suppressed by the Pseudomonas sp. In batch culture experiments the Pseudomonas had no effect on the growth of the mixed microbial population in dilute nutrient broth over a period of 5 days.

This experiment was repeated with a second sample of mixed microbial culture, freshly isolated from a York Waterworks slow sand filter. In this experiment the Pseudomonas counts were almost identical with those from the previous experiment over a period of 12 days. However, the decrease in the total bacterial count over this period was much less than that observed in the first experiment after the same length of time (38% as compared to 86%).

(ii) Growth of Pseudomonas in the Filter in the Absence of Other Microorganisms

The reservoirs of duplicate filter systems (C and D), with circulating artificial river water, were inoculated with Pseudomonas on day 1 and water circulation was continued at 857 ml/h. On day 4, the reservoirs were replaced with fresh sterile artificial river water and circulation was continued. On day 8 the system was flushed with 5 litres fresh artificial river water, and then circulation was recommenced with further sterile artificial river water. The effluent water was monitored for fluorescent Pseudomonas at intervals. The results of the duplicate experiments are shown in Table 2.

TABLE 2

Fluorescent pseudomonas count (cfu/ml) in effluent from filters

| Days after inoculation | Filter C | Filter D |
|---|---|---|
| 1 | 1430 | 1280 |
| 2 | 2100 | 1950 |
| 3 | 4210 | 5130 |
| 6 | 4800 | 5200 |
| 7 | 5320 | 5320 |
| 8* | 5250 | 5420 |
| 9 | 5410 | 5290 |
| 12 | 5300 | 5360 |

*indicates the changes of circulating water.

The behaviour of the Pseudonionas strain was similar to that observed in the mixed microbial filter. Bacteria colonised the filter during the inoculation stage, and persisted, with some initial release into the circulating water, following each change to fresh, sterile water, over the remaining period of the experiment The number of bacteria in the effluent water stabilised, as before, at about 5000 bacteria per ml.

(iii) Effect of Used Hydroponic Fluid on Pseudomonas Growth and Stability in the Filter To determine whether plain root exudates and residual hydroponic nutrients in used hydroponic fluid had any effect on the colonisation and stability of Pseudomonas in the filters, the filters already used in the above experiment (C and D) were used.

Autoclave-sterilised hydroponic fluid (Filter C) or unsterilised hydroponic fluid (Filter D) was metered into the stirred 5 liter reservoir of artificial river water, while a constant level was maintained in the reservoir by overflow (see "Methods"). By this means a gradual, complete replacement of the water by hydroponic fluid was achieved over a period of 6.4 h. During the changeover, and subsequently, the on in the reservoir was continuously circulated through the filters at 857 ml/h. Samples of the effluent from the filters were counted for fluorescent pseudomonads. The results are shown in Table 3.

TABLE 3

Numbers of Pseudomonas (cfu/ml) in effluent from filter during and following change over to hydroponic fluid

| Days after start | Sterile fluid | Unsterilised fluid |
|---|---|---|
| 1 | 4030 | 3980 |
| 2 | 4100 | 3900 |
| 3 | 3980 | 3400 |
| 4 | 3800 | 3980 |
| 7 | 4200 | 4100 |
| 8 | 4350 | 4080 |
| 9 | 4910 | 4250 |
| 10 | 4800 | 4620 |
| 11 | 4150 | 4260 |
| 14 | 4360 | 4400 |
| 15 | 4290 | 4630 |
| 16 | 4900 | 4850 |
| 17 | 5150 | 4720 |
| 18 | 5270 | 4650 |
| 21 | 5030 | 4720 |

The change to hydroponic fluid caused no significant change or destabilisation of the Pseudomonas population in the filter system. The unsterilised hydroponic fluid contained some indigenous fluorescent pseudomonads, but these had no significant effect of the results. No fungal growth was observed on any of the monitoring plates, or on plates spread with unsterilised hydroponic fluid, even after incubation for 10 days at 250° C.

(iv) Establishment of Pseudomonas in a Filter With Circulating Sterilised Hydroponic Fluid The reservoir of a filter system (Filter E) with circulating autoclaved, used hydroponic fluid was inoculated with Pseudomonas as for previous experiments and Pseudomonas in the effluent from the filter was monitored over a period of 19 days following inoculation. The results (not shown) were essentially identical to those observed in the previous experiment. Effluent counts remained constant over the entire period.

(v) Survival of Other Bacteria From the Filter System

Figure 2:
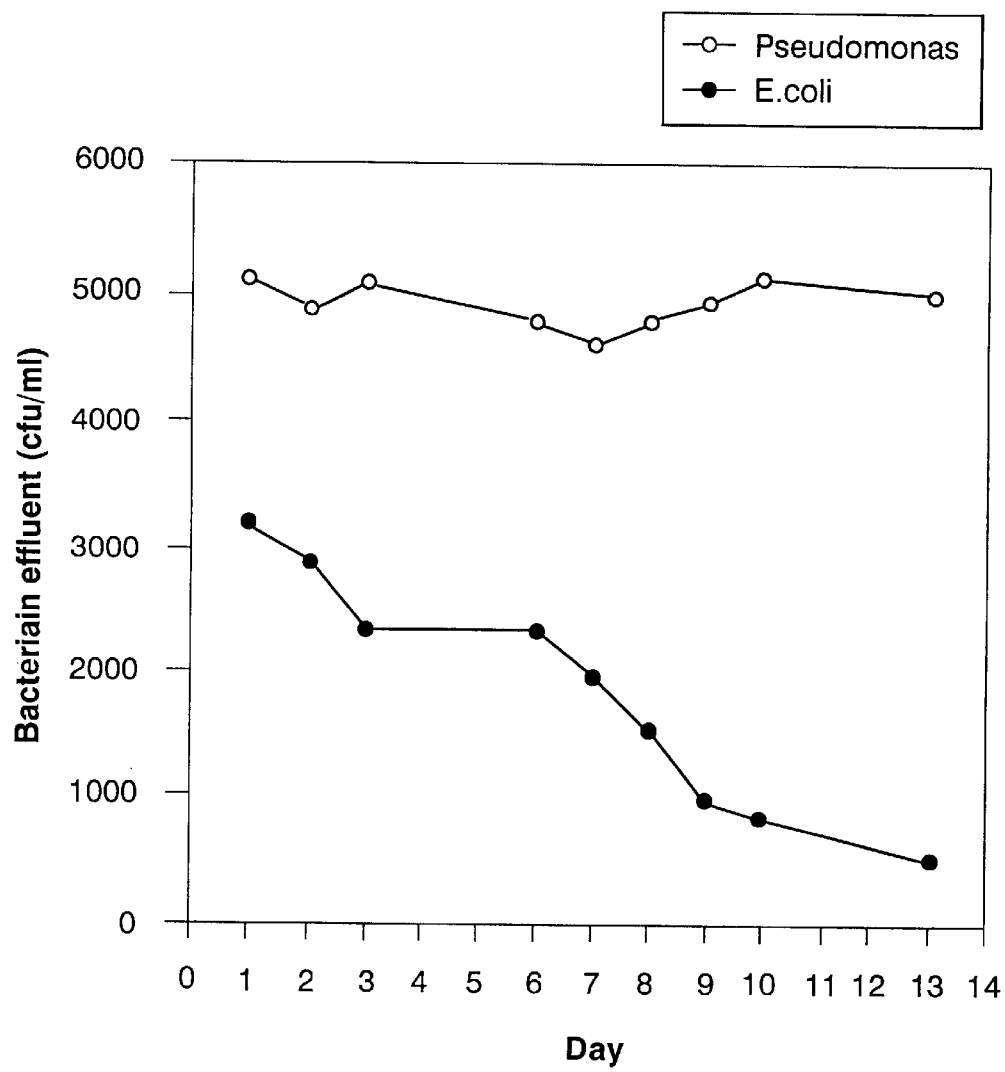

Initial experiments with filters impregnated with a mixed microbial population had suggested that introduction of the Pseudomonas strain might lead to a reduction in the numbers of other bacteria in the system. However, it could not be ruled out that the mixed microbes survived in the but were not leached out, or alternatively were killed in the planktonic state, in the presence of the Pseudomonas. To test this further, after 19 days the reservoir of Filter E (see above) was inoculated with *Escherichia coli*. Pseudomonas and *E. coli* were monitored in the effluent from the filter over a period of 12 days. The results are shown in FIG. 2.

Although the *E. coli* cells were not immediately filtered out of the circulating liquid (the whole of the liquid passed through the filter 4 times per day), as was the case with filters impregnated with a mixed microbial population, there was progressive loss over the period of the experiment, while the Pseudomonas population remained constant.

Microscopic examination of colonies and stained bacteria from the effluent revealed no detectable changes in the Pseudomonas species during the course of the work.

Suppression of Disease in Tomato Plants (a) Introduction

To determine the efficacy of root microflora for suppressing root pathogens, a series of independent nutrient film technique (NFT) channels were used to conduct small scale, replicated experiments on young tomato plants infected with the aggressive root pathogen *Phytophthera cryptogea*.

(b) Microbial Inoculants and Impregnation of Filters

An isolate of *Pseudomonas fluorescens* 3989A, sourced from the roots of a hydroponic tomato crop at HRI, Stockbridge House, Cawood, Selby, Notth Yorkshire, YO8 OTZ, United Kingdom, was used to prime a series of filter units. Separately, a mixture of bacterial isolates recovered from the "Schmutzdecke" (surface layer) of a slow sand filter was used to impregnate separate filters. Filters were supplied in a moist impregnated form. Two filters were connected to each NFT plot (unfiltered plots included) aiming for a flow rate through the filter of 25% total volume.

Non-impregnated (unprimed) filters were also included as controls for comparison.

(c) The following treatments were carried out:

Treatments
1. Uninoculated, unfiltered control
2. Inoculated*, unfiltered control
3. Uninoculated, unprimed filter control
4. Inoculated*, unprimed filter control
5. Uninoculated, filter primed with *Ps. fluorescens*
6. Inoculated*, filter primed with *Ps. fluorescens*
7. Uninoculated filter primed with microbial components from an active "Schmutzdecke" layer
8. Inoculated*, filter primed with microbial components from an active "Schmutzdecke" layer Inoculated with *P. cryptogea*, isolate PCl (d) Inoculum and Inoculation Procedure An "infector" plant, previously inoculated with the pathogen *P. cryptogea* (isolate PCl) from an infected commercial crop, was placed at the inlet of each of the inoculated plots. In addition, a small muslin bag containing 4×1 cm discs of agar containing the pathogen was inserted into each solution reservoir (treatments T2,4,6 and 8 only).

(e) Growing Regime

The crop was grown in NFT with a mean flow rate of ca. 3–4 l/min at a day/night time temperature of 18° C. and 16° C. with a vent set point at 20/10° C. respectively. The experiment was terminated prior to fruit development and yield data was not recorded. The hydroponic solution was adjusted to EC 3.5 and pH corrected to 5.0–6.0 at the start of the experiment and this was corrected periodically as the tanks were refilled.

(f) Disease Assessments

At intervals during the experimental period (first and second planting) detailed assessments of root infection were carried out. Where subjective "visual" assessments were carried out a 0–3 scale of severity was used. Each data set was then converted to a 0–100 Index using the following formula.

$$\frac{1(1)+2(2)+3(3)}{No. Assessed} \times \frac{100}{3}$$

At each interim assessment the mean lesion length was determined by measuring 4 random root lesions on each plant. At termination of each planting the mean lesion number was assessed per unit area of roots using a 4×4 cm quadrant, placed between plants down each NFT channel. At termination visual assessments were carried out on a 0–5 scale of severity and converted to a 0–100 index using a formula modified from that above.

(g) Microbial Monitoring

At weekly intervals hydroponic solution samples taken from the reservoirs were tested in order to quantify microbial population levels in each treatment.

(h) Pathogen Establishment

In response to the introduction of "infector" plants at the top of each channel and agar inoculum in a muslin bag in the recirculation tank (treatments T1,3.5,7 excluded), the pathogen liberated propagules into the recirculating solution and was disseminated evenly down the NFT channels. This was demonstrated by characteristic lesions on the roots on the uninoculated plants further down the row.

Approximately one week after "infector" plant introduction, the first signs of root infection were observed.

Initial assessments demonstrated occasional lesions in T4 (inoculated, unprimed filter treatment) only. Five days later lesions were evident on roots in all inoculated plots. Inoculated, unfiltered (T2) and "unprimed" filtered (T4) controls showed highest root discoloration indices and mean lesion length.

Interim and final root assessment on the plants provided further evidence which indicated that both the primed filter treatments, but particularly the microbial complex, suppressed the level of root infection by *Phytophthora cryptogea*.

In an assessment of root development and discoloration, the mean lesion number per unit area root tissues was determined—see Table 4.

TABLE 4

Final assessment of root development and discoloration of the roots on the tomato plants in the NFT channels on 17 September 1997 at crop termination

| Treatment | Root Development Index (0–100) | Root Discoloration Index (0–100) | Lesion No per Unit Area |
|---|---|---|---|
| T1 Uninoculated no filter | 72.4 | 1.0 | 0.0 |
| T2 Inoculated no filter | 64.8 | 33.4 | 6.7 |
| T3 Uninoculated Unprimed filter | 75.2 | 0.0 | 0.0 |
| T4 Inoculated, Unprimed filter | 49.6 | 38.0 | 7.1 |
| T5 Uninoculated, PS f1 Filter | 71.4 | 1.0 | 0.0 |
| T6 Inoculated, Ps f1 Filter | 78.4 | 23.0 | 2.8 |
| T7 Uninoculated, MC filter | 71.4 | 1.0 | 0.0 |
| T8 Inoculated, MC filter | 70.4 | 29.6 | 2.3 |

Mean lesion numbers per unit area of roots was reduced where the filters were primed with *Ps fluorescens* and the microbial complex.

(g) Conclusions (i) It appears that the Pseudomonas becomes established in both the presence and absence of a pre-existing microbial biofilm. The observation that the system retains a constant planktonic population of the bacteria over several weeks indicates that the bacteria must be established as an adherent population in the filter, with continuous release of a proportion of the cells into the circulating water. Experiments 2 and 3 show that the planktonic population originates from the filter: complete replacement of the circulating water with fresh sterile water does not reduce the planktonic population.

(ii) Over the period of the experiments (up to 21 days in Experiment 1) the population remained remarkably stable.

(iii) Experiments 3 and 4 indicate that the material in used hydroponic fluid does not affect the growth or stability of the filter and planktonic populations to a significant extent, either before or after autoclaving of the fluid.

(iv) It is possible to establish an adherent population of live Pseudomonas in the filter. As a dilute salts solution, free of organic material, flows through it, this population releases a proportion of the bacteria into suspension in the liquid to form a "planktonic" population. The viability of this population has not been measured, but since the population remained constant, the bacteria must either have a short lifetime after release from the filter, or be re-entrained in the filter during subsequent cycles through the filter. Death of part of the population might be providing the nutrients required for growth of the biofilm population. Additional organic compounds expected to be present in used hydroponic fluid did not affect the stability of the system—apparently any root exudate products are compatible with the Pseudomonas biofilm. Although the results were quantitatively variable, they suggested that the Pseudomonas population gradually suppressed other bacteria in the system.

(v) *Ps fluiorescens*, originally isolated from tomato roots in a "closed" environment was successfully bulked up in artificial culture and applied to a filter medium.

(vi) a microbial mix including an isolate of *Ps fluorescens* from the "schmutzdecke" layer of an active slow sand filtration unit was successfully prepared, bulked up and applied to a filter medium.

(vii) experimental filters were successfully installed into small replicated plots of NFT tomatoes and adjusted to recycle ca 25% of the NFT solution.

(viii) non-impregnated (unprimed) filters were included as controls for comparison.

(ix) replicative trials were performed in order to evaluate the performance of the microbially impregnated filters with a tomato plant infected with the specific root pathogen P cryptogea.

(x) in assessing root development and discoloration of the crop plant, it became apparent that mean lesion numbers per unit area of root tissue for filters primed with Ps fluorescens or the microbial complex were significantly reduced, as compared with experimental data from inoculated plots with unprimed or no filter.

(xi) experimental evidence suggests that both primed filter treatments, but particularly the microbial complex, suppressed the level of root infection by P cryptogen.

What is claimed is:

1. A method for the hydroponic cultivation of plants comprising:
   (a) passing a nutrient liquid through a filter, the filter containing one or more cultures of microorganisms, the microorganisms being capable of controlling the growth or germination of pathogenic fungi;
   (b) releasing a portion of one or more cultures of microorganisms from the filter into the nutrient liquid to form a liquid containing nutrients and an effective amount of microorganisms capable of controlling the growth or germination of pathogenic fungi; and
   (c) contacting the liquid containing nutrients and microorganisms obtained from step (b) with at least the roots of the plants, or parts thereof.

2. The method according to claim 1 wherein the filter is fibrous and the fibers have lengths of about 1 mm.

3. The method according to claim 1 wherein the microorganisms comprise bacteria and/or non-pathogenic fungi.

4. The method according to claim 1 wherein the microorganisms comprise bacteria from the *Pseudemonas fluorescens* group.

5. The method according to claim 1, wherein the filter is initially impregnated with the microorganisms before inserting into a filter unit.

6. The method according to claim 1, wherein the filter has been freeze-dried.

7. The method according to claim 1, wherein the filter is vacuum-packed.

8. The method according to claim 1, wherein the filter includes one or more mineral fibre slabs or blocks.

9. The method according to claim 8, wherein the density of the slab or block is between 25 and 180 kg/m$^3$.

10. A filter unit for treating nutrient liquid in a hydroponic plant cultivation system comprising:
    (a) a pre-filter for removing particulate matter from the nutrient stream;
    (b) an assembly containing fibrous filter impregnated with biomaterial;
    (c) a flow means for transporting nutrient liquid through the fibrous filter so that the biomaterial is released in a continuous, controlled manner into the nutrient liquid; and
    (d) a discharge means to discharge the nutrient liquid containing a portion of the biomaterial from the filter unit.

11. The filter unit according to claim 10, wherein the biomaterial is adopted to be released continuously into the nutrient stream passing there through in an amount sufficient to control the growth or germination of pathogenic fungi in the hydroponic plant cultivation system.

* * * * *